United States Patent [19]

Schmid et al.

[11] Patent Number: 5,264,692

[45] Date of Patent: Nov. 23, 1993

[54] CIRCUIT ARRANGEMENT FOR THE OPERATION OF A LIGHT SOURCE FOR THE OPTICAL SCANNING OF RECORDING MEDIA

[75] Inventors: Helmut Schmid, Hohenhameln; Andreas Rösinger, Hannover; Günter Nötzel, Hildesheim, all of Fed. Rep. of Germany

[73] Assignee: Robert Bosch GmbH, Stuttgart, Fed. Rep. of Germany

[21] Appl. No.: 852,142

[22] PCT Filed: Nov. 10, 1990

[86] PCT No.: PCT/DE90/00853

§ 371 Date: Apr. 27, 1992

§ 102(e) Date: Apr. 27, 1992

[87] PCT Pub. No.: WO91/09399

PCT Pub. Date: Jun. 27, 1991

[30] Foreign Application Priority Data

Dec. 9, 1989 [DE] Fed. Rep. of Germany ....... 3940720

[51] Int. Cl.$^5$ .............................................. G01J 1/32
[52] U.S. Cl. .................................... 250/205; 307/311
[58] Field of Search ............... 250/205, 214 R, 214 A; 307/311

[56] References Cited

U.S. PATENT DOCUMENTS

| | | | |
|---|---|---|---|
| 4,580,044 | 4/1986 | Hongo et al. | 250/205 |
| 4,689,795 | 8/1987 | Yoshimoto et al. | 372/31 |
| 4,692,606 | 9/1987 | Sakai et al. | 259/205 |
| 4,698,797 | 10/1987 | Komatsu | 369/116 |
| 4,733,398 | 3/1988 | Shibagaki et al. | 372/31 |
| 4,827,116 | 5/1989 | Takagi et al. | 250/205 |

FOREIGN PATENT DOCUMENTS

| | | |
|---|---|---|
| 0169579 | 1/1986 | European Pat. Off. |
| 3232682 | 5/1983 | Fed. Rep. of Germany |
| 61-184742 | 8/1986 | Japan |

Primary Examiner—David C. Nelms
Assistant Examiner—K. Shami
Attorney, Agent, or Firm—Frishauf, Holtz, Goodman & Woodward

[57] ABSTRACT

In a circuit arrangement for the operation of a light source for the optical scanning of recording media, in particular so-called compact discs, from an information signal obtained by the scanning a signal (quality signal) is derived which describes the quality of the information signal. The power of the light source is controlled in dependence on the quality signal with the aim of maximising quality.

18 Claims, 2 Drawing Sheets

5,264,692

CIRCUIT ARRANGEMENT FOR THE OPERATION OF A LIGHT SOURCE FOR THE OPTICAL SCANNING OF RECORDING MEDIA

FIELD OF THE INVENTION

The present invention relates generally to CD readers and, more particularly, to control circuits which minimize read errors by controlling laser output.

BACKGROUND

When reading data from optical recording media, in particular from so-called compact discs (CDs), to achieve as high a quality as possible of the signal generated by the opto-electric receiver an optimum setting of the power of the laser is required. U.S. Pat. No. 4,698,797, Komatsky, discloses a CD reading device in which the information signal reflected from the CD and received by the reading device is evaluated by a controlling circuit. In this case, the controlling circuit controls the output power of a laser diode, acting as transmitter, in such a way that the level of the received information signal is kept at a constant value, corresponding to a predetermined, fixed reference voltage. In this case, due to temperature changes, ageing and soiling, a signal of poorer signal-to-noise ratio may be produced, which results in a higher error rate of the read-out data.

SUMMARY OF THE INVENTION

The object of the present circuit arrangement is to ensure the satisfactory function of a CD reading device irrespective of temperature and other ambient influences and to guarantee as low an error rate as possible.

The circuit arrangement according to the invention has the advantage that the output power of the laser assumes an optimum value irrespective of the above-mentioned influences.

Further developments of the invention permit, inter alia, a determination of that direction in which the output power of the laser is in each case to be changed. The invention may be specifically carried out with the aid of analog or digital circuits or with suitable microcomputers and signal processors as well as corresponding programs.

DRAWINGS

FIG. 1 shows a first exemplary embodiment, in which a quality signal is derived with the aid of an envelope detector, FIG. 2 shows a second exemplary embodiment, in which a quality signal is derived from an error signal, FIG. 3 shows a third exemplary embodiment, in which the circuit according to the invention is realised with the aid of a microcomputer, and FIG. 4 shows an exemplary embodiment in which the function of the circuit arrangement according to the invention is assumed by a signal processor, which also carries out the processing of the output signals of the opto-electric receiver, including error correction.

The same parts are provided with the same reference numerals in the figures.

DETAILED DESCRIPTION

Figure 1:
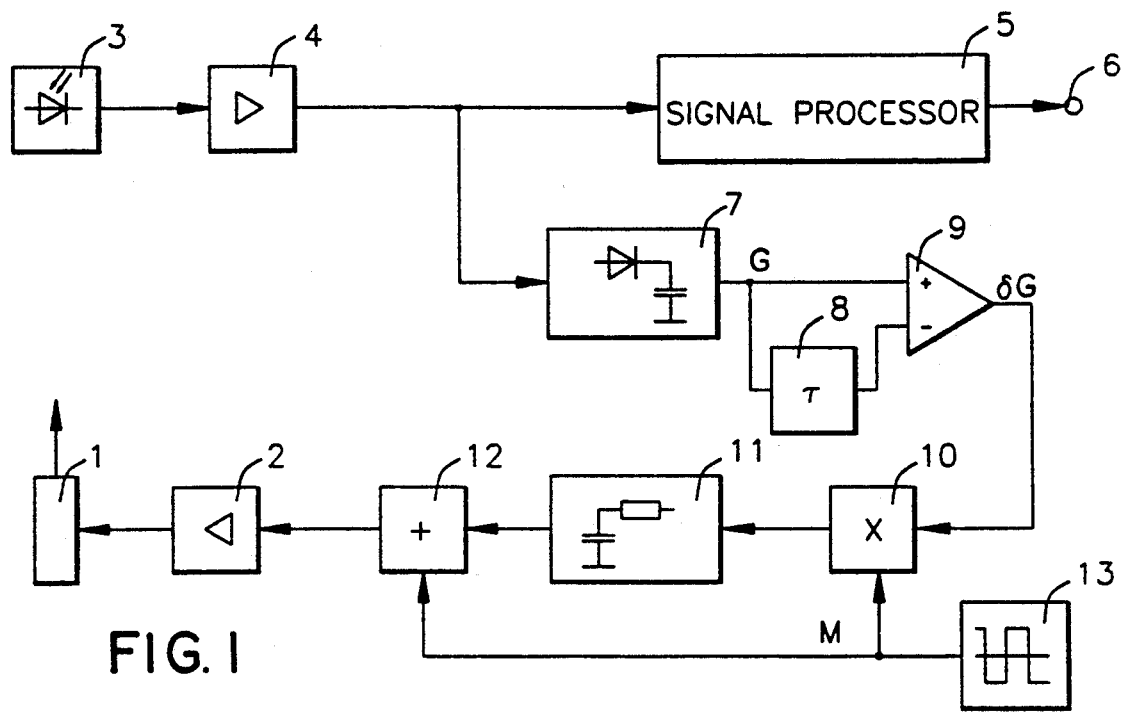

In FIG. 1, of a known CD reading device only a laser 1, an output stage 2, a receiver diode 3, which serves as opto-electric receiver, a preamplifier 4 and a signal processor 5 are shown, from the output 6 of the latter the read data can be taken. Further details of CD reading devices are known per se and need not be explained in any more detail in the context of the present invention.

In the case of the exemplary embodiment according to FIG. 1, the output signal of the preamplifier 4 is passed via an envelope detector 7 for the generation of a quality signal. With optimum setting of the power of the amplifier 1, the output signal of the preamplifier 4 has the greatest amplitude, so that the quality signal G assumes the maximum value. Under less favourable conditions, the quality signal G becomes correspondingly smaller. With a delay circuit 8 and a comparison circuit 9, the change δG in the quality signal G is determined. The output signal of the comparison circuit 9 is referred to hereinafter as quality-change signal.

The quality-change signal passes via a multiplier 10 to a controller 11, which is essentially an integralaction controller. The output signal of the controller 11 is fed via an adder 12 to the input of the output stage 2. Both the multiplier 10 and the adder 12 receive from a generator 13 an alternating (square-wave) voltage (modulation voltage M), the frequency of which is considerably less than the scanning frequency on which the recorded data are based.

During the positive half-wave of the modulation voltage M, the power of the laser 1 is increased with respect to the power predetermined by the controller. The effect on the signal amplitude, and consequently on the quality signal G, may be an improvement or deterioration, depending on which side of a maximum the current controlled condition is situated. In the case of an improvement the quality-change signal δG is likewise positive, which, due to the multiplication at 10 by a positive value, leads to a positive input voltage for the controller 11. This in turn increases its output signal correspondingly. If, however, the increase in the laser power has produced a deterioration within the positive half-wave of the modulation voltage M, the quality-change signal δG becomes negative, so that a negative input voltage is obtained for the controller and consequently also a (gradual) reduction in the output signal.

In the second half-wave, a reduction in the power of the laser takes place. Assuming that now the laser is also operated below its optimum power, due to this reduction the quality signal G becomes smaller—and consequently the quality-change signal δG becomes negative Due to multiplication of the negative quality-change signal δG by the negative half-wave of the signal M, a positive signal is then produced, which supports a further increase in the output power of the laser with the help of the controller 11. If the quality-change signal or the modulation voltage M is generated as a purely binary signal, the multiplication can be carried out with an amplifier which is operated in inverting or non-inverting mode, depending on the binary signal.

The power of the controller is optimised by the described process, the effects of the modulation on the quality of the read signals being extremely small. In the case of a binary quality-change signal, which can thus assume only two states "quality is lower" or "quality is higher", the same effect is achieved as by the multiplier, even with an exclusive-OR circuit.

The logic operation on quality-change signal and modulation voltage can also be performed by a semiconductor switch, which either passes the modulation voltage to the controller 11 in the case of a positive quality-change signal or passes the quality-change signal to the controller 11 in the case of a positive modulation voltage.

Figure 2:
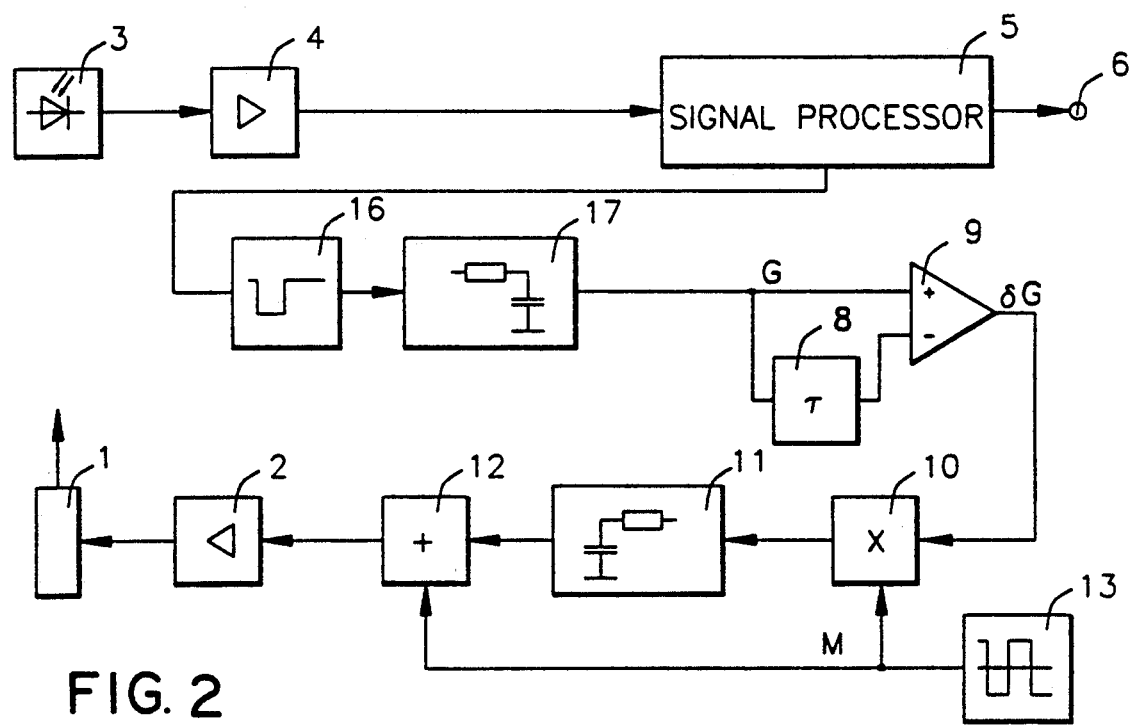

In the case of the exemplary embodiment according to FIG. 2, the quality signal G is derived from an error signal, which is produced in any case in the processor 5 of a known CD reading device. The error signal comprises pulses which occur in each case if the processor 5 detects an error. These pulses are initially passed via a pulse shaper 16, which comprises a monostable circuit and emits pulses of constant width. These pulses are directed toward 0 volts from a constant value between the pulses. In a subsequent averaging, a direct voltage is derived therefrom, the value of which is all the lower the more frequently the pulses occur. Thus, the direct voltage value or quality value is the inverse of the error rate. Otherwise, the exemplary embodiment according to FIG. 2 resembles that represented in FIG. 1. According to specific prerequisites, a person skilled in the art can choose between the two represented ways of deriving a quality signal.

Figure 3:
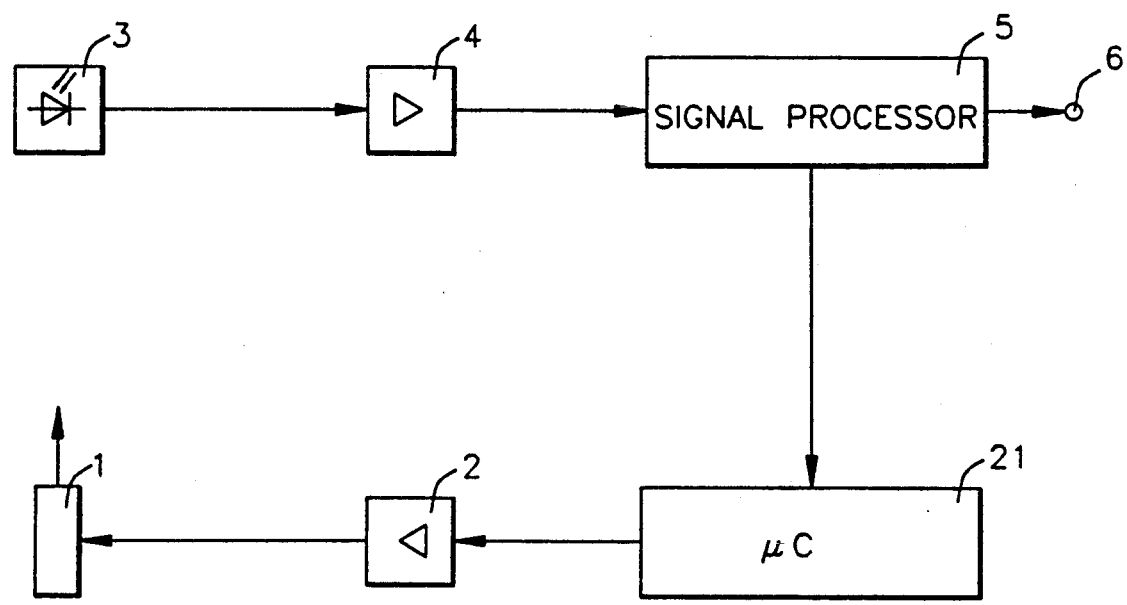

FIG. 3 shows an exemplary embodiment in which the functions of the modules 7 to 12, as well as 16 and 17 of the circuit arrangement according to FIG. 2 are undertaken by a microcomputer 21. Suitable microcomputers are known per se. The program required for the control according to the invention essentially comprises those functions which have already been described in conjunction with the individual circuit blocks in FIG. 2. In a similar way, the circuit arrangement according to FIG. 1 can also be realised with the aid of a microcomputer. For this purpose, for example there may be provided after the envelope detector 7 an analog/digital converter, to which one input of the microcomputer is connected.

Figure 4:
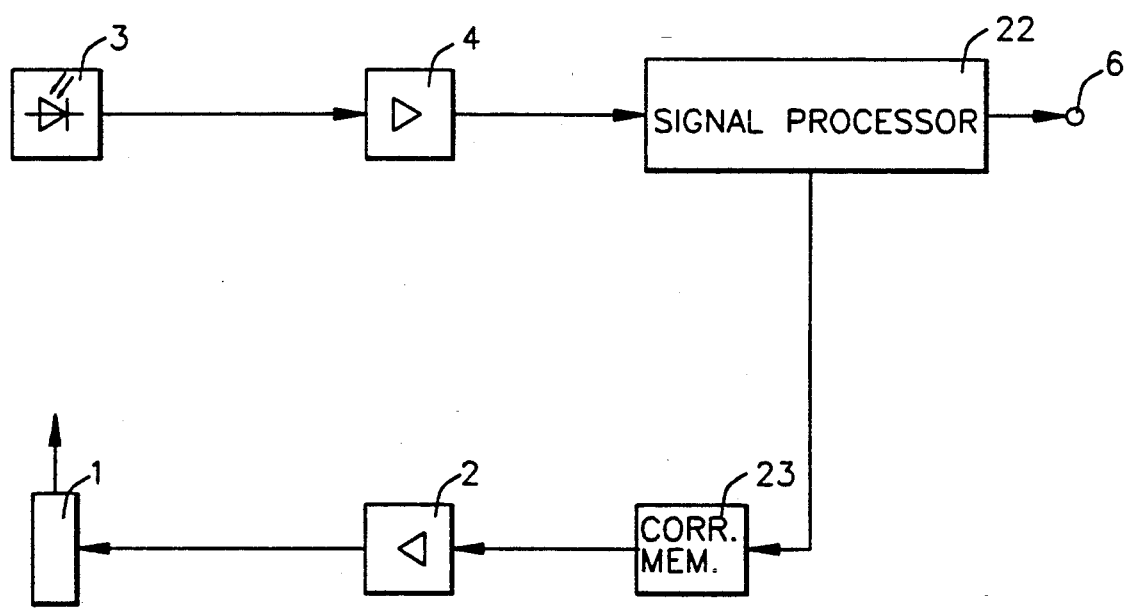

In the case of the exemplary embodiment according to FIG. 4, in addition to processing the read signals, a signal processor 22 also undertakes the controlling of the power of the laser in the way already described in conjunction with FIGS. 1 and 2. Since, in general, the controlling of the power of the laser only has gradual changes as a consequence, the signal processor 22 need only execute signal processing steps for the control when no processing of the information signal is taking place. This is, for example, the case when the CD reading device is in operation, but no data are required at the output 6.

The respectively determined correcting variable may in this case be stored in a memory in the signal processor, an output of the stored data to the output stage 2 (via a digital/analog converter which is not shown) being required relatively frequently. It is, however, also possible to relieve the signal processor 22 of this and to provide a separate memory 23 for the correcting variable.

We claim:

1. Control circuit for operating a light source (1) in a system for optical scanning of an optical recording medium
  comprising
  an optical receiver (3) which picks up a light beam resulting from interaction of light, generated by said light source (1), with said optical recording medium, and generates an information signal;
  means (5,7), coupled to an output of said optical receiver (3), for generating a quality signal representing at least one of amplitude of said information signal, and the inverse of an error rate of said information signal; means (8,9), coupled to an output of said quality signal generating means, for measuring change in said quality signal, with respect to time, and deriving therefrom a quality-change signal; and
  means (10-12), coupled to an output of said quality-change signal deriving means, for setting output power of said light source (1) to a level which maximizes said quality signal (G).

2. Control circuit according to claim 1, wherein (FIG. 1) said quality signal generating means is an envelope detector (7).

3. Control circuit according to claim 1, wherein (FIG. 2) said quality signal generating means comprises
  a signal processor (5) which monitors said information signal for errors and generates an error pulse each time an error is detected; and
  means (16,17), coupled to an error pulse output of said signal processor (5), for generating a DC voltage signal which is lower when error pulses occur frequently and higher when error pulses occur seldom.

4. Control circuit according to claim 1, wherein (FIG. 3) said quality signal generating means comprises
  a signal processor (5) which monitors said information signal for errors and generates an error pulse each time an error is detected; and
  a microcomputer (21) coupled to an error pulse output of said signal processor (5), and having a control output which controls power of said light source (1).

5. Control circuit according to claim 1, wherein FIG. 4) said quality signal generating means comprises
  a signal processor (22) which monitors said information signal for errors, generates said quality signal, and sends a corresponding correcting signal and
  a memory (23), coupled to a correcting signal output of said signal processor (22), storing a table associating respective correcting signal values with respective light source power control values, and applying a control signal value to said light source (1), in response to each correcting signal received from said signal processor (22).

6. Control circuit according to claim 1,
  wherein the power of the light source (1) is modulated periodically in order to determine whether a power change results in a higher quality signal, thereby indicating a new optimum power setting.

7. Control circuit according to claim 2, further comprising
  a delay circuit (8) coupled to an output of said envelope detector, and
  a comparison circuit (9) having a first input connected to an output of said envelope detector (7), a second input connected to an output of said delay circuit (8), and an output furnishing a quality-change signal;
  an alternating voltage generator (13) producing a modulation signal (M); and
  means for performing a logic operation which combines said quality-change signal with said modulation signal (M).

8. Control circuit according to claim 7,
  wherein
  the logic operation is performed by a multiplier (10).

9. Control circuit according to claim 7,
  wherein the logic operation is performed by a semiconductor switch.

10. Control circuit according to claim 7, wherein
said quality-change signal and said modulation signal are both binary signals and the logic operation is performed by an exclusive-OR circuit.

11. Control circuit according to claim 1, wherein
the quality signal is derived from the amplitude of the information signal.

12. Control circuit according to claim 11, wherein
the quality signal is derived from the amplitude of the information signal by envelope rectification.

13. Control circuit according to claim 1, wherein
the quality signal is derived from pulses of an error-correction circuit.

14. Control circuit according to claim 3, wherein (FIG. 2) an analog quality signal is obtained from the pulses by the steps of
shaping pulses (16) of constant width, and subsequently averaging output voltage values from said signal processor.

15. Control circuit according to claim 1, wherein the generation of the quality-change signal and the logic operation are performed with the aid of a microcomputer (21).

16. Control circuit according to claim 1, wherein (FIGS. 3-4)
a signal processor (22) is provided for processing said information signal, and also effects an experimental modulation (raising and lowering) of the power of the light source (1),
calculates said quality signal (G) and any changes in the quality signal,
integrates the changes in the quality signal with the correct operating sign, in dependence upon the raising or lowering of the power, and outputs the result of said integration as a corrective signal for the power of said light source (1).

17. Control circuit according to claim 16, wherein signal processing steps for control of output power of said light source (1) takes place in the signal processor (22) at times in which processing of said information signal, for purposes of reading data stored on said optical medium, is not taking place.

18. Control circuit according to claim 16, wherein signal processing steps for control of output power of said light source (1) take place at times in which processing of said information signal, for purposes of reading data stored on said optical medium, is not taking place.

* * * * *